Feb. 16, 1965 E. HAJOS 3,170,052
MAGNETICALLY RESTORABLE SENSING SWITCH
Filed Aug. 17, 1961 2 Sheets-Sheet 1

INVENTOR.
Eugene Hajos
BY
ATTORNEYS

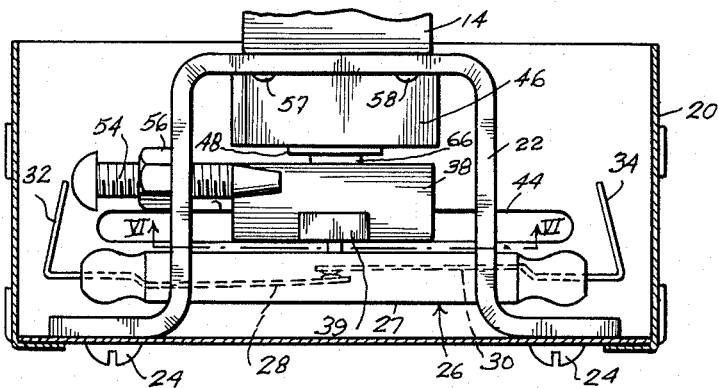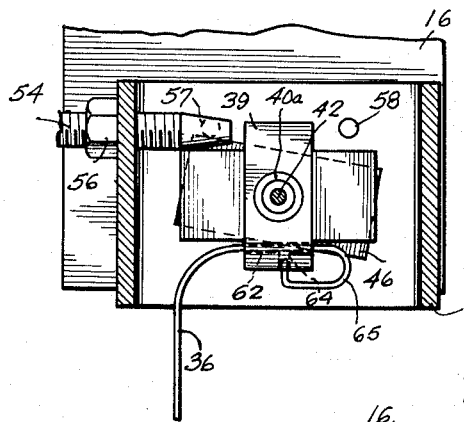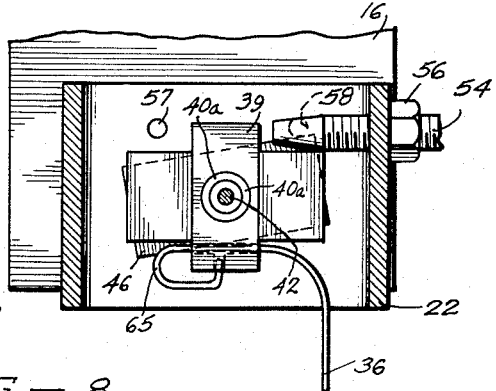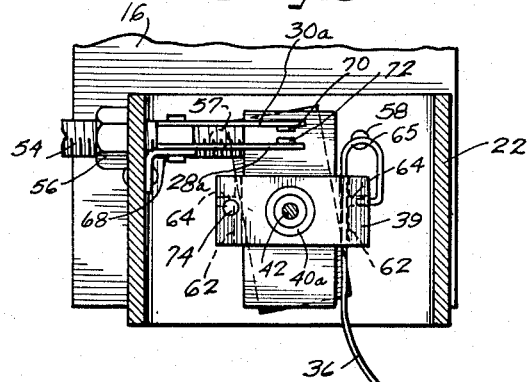
INVENTOR.
Eugene Hajos
ATTORNEYS

United States Patent Office 3,170,052
Patented Feb. 16, 1965

3,170,052
MAGNETICALLY RESTORABLE SENSING SWITCH
Eugene Hajos, Chicago, Ill., assignor to Hydraxtor Company, Skokie, Ill., a corporation of Illinois
Filed Aug. 17, 1961, Ser. No. 132,137
15 Claims. (Cl. 200—61.41)

This invention relates to a sensing switch, and more particularly to a sensing switch responsive to the passing of paper, towels or registering of coins or the like, and which eliminates the need for spring means to effect a return action for the sensing element for the switch.

Heretofore, sensing switches have been utilized for detecting the passage of paper, towels or the like but such devices have employed spring means to return the sensing finger or contact, with many attendant difficulties.

In accordance with the present invention, the need for a spring is eliminated by the use of a magnetic return arrangement. Specifically, a first magnet is operated by a movement sensing element such as a "cat whisker" wire, thereby to operate switch contacts disposed in a sealed container. A second stationary magnet then operates on the first magnet to return it to a predetermined initial position.

Further in accordance with the invention, a concentric mounting for the device is provided in which the position at which switching occurs may be accurately adjusted without changing the effective length of the movement sensing element. To this end, a housing for the device may be rotated to vary the position of the switch relative to the magnet.

Accordingly, it is an object of the present invention to provide a sensing switch of a simple, rugged and effective construction and which is restored by magnetic means, whereby to eliminate the spring means heretofore required for the purpose and afford an even restoring force.

Another object of the invention is to provide a device as described which is readily adjustable to vary the position at which switching occurs, by virtue of a concentric mounting for the device.

Other objects and advantages of the invention will become apparent as the description proceeds in accordance with the drawings, in which:

FIGURE 5 is a horizontal sectional view of another embodiment of a sensing switch according to the invention;

FIGURE 6 is a vertical sectional view, partly broken away, of the structure shown in FIGURE 5, as taken in front of the switch element thereof;

FIGURE 7 is a corresponding view of another form of the structure shown in FIGURES 5 and 6; and FIGURE 8 is a vertical sectional view of still another embodiment of the invention.

Figure 1:
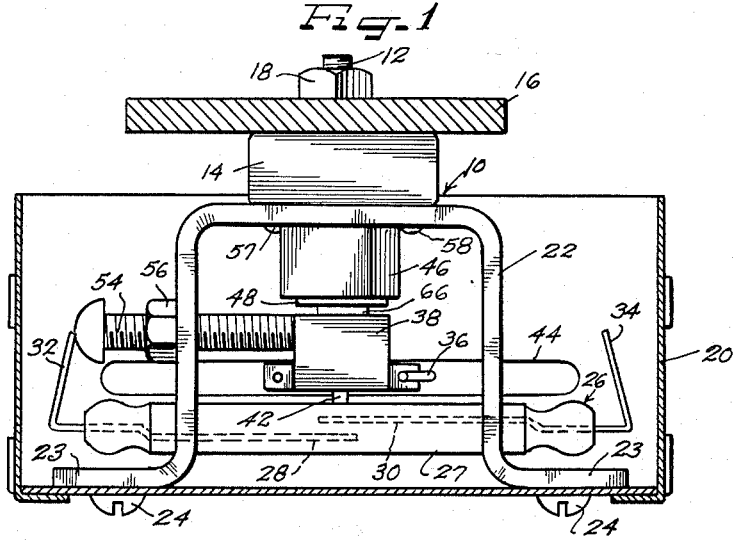
FIGURE 1 is a horizontal sectional view of a sensing switch according to the present invention.
Figure 2:
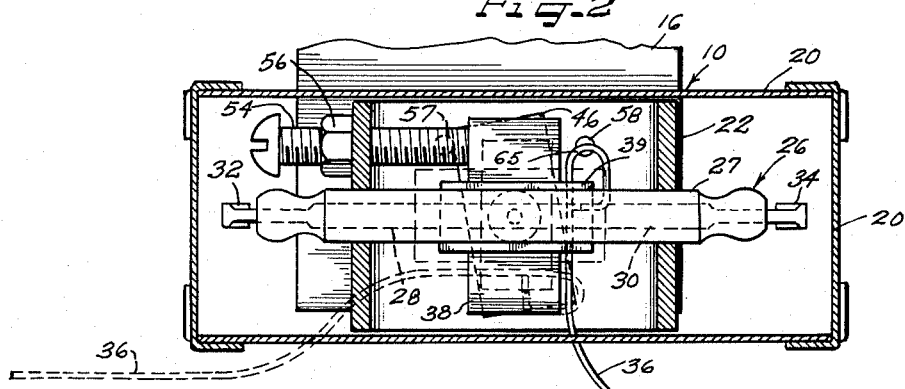
FIGURE 2 is a vertical sectional view, partly broken away, of the structure shown in FIGURE 1.
Figures 3, 4:
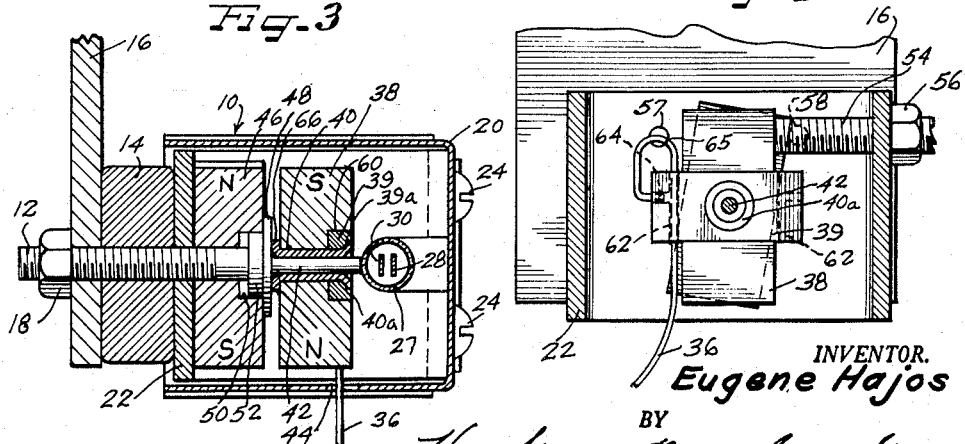
FIGURE 3 is a vertical sectional view of the structure shown in FIGURE 2.
FIGURE 4 is a vertical sectional view, partly broken away, of another form of the structure as shown in FIGURE 2 and taken in front of the switch element thereof.

Referring now to the drawings, and to FIGURES 1 to 3 in particular, a sensing switch 10 is shown in accordance with the present invention which is effective for detecting the passage of paper, towels or the like, although it may be utilized in a wide variety of applications in addition to the described use. The sensing switch 10 is characterized by a concentric mounting for the elements which renders it exceptionally compact and also affords advantages in adjustment of the sensing action, as hereinafter set forth. To this end, the sensing device 10 includes support means comprising an elongated support member 12 of non-magnetic material such as stainless steel threaded in a bearing block or locking adjustment nut 14 and secured to a support wall 16 as by a nut element or the like 18. A housing 20 is concentrically mounted on the elongated support member 12 by means of a U-shaped yoke or bracket 22 secured by turned end flanges 23 thereof and bolts 24 or the like to the forward wall of the housing. A switch 26 is secured in the parallel forwardly extending legs of the bracket 22 by suitable adhesive or the like and preferably includes a glass enclosed capsule 27 having switch blades 28 and 30 mounted in opposite ends thereof. The inner ends of the blades 28 and 30 overlap in normally spaced, parallel relation and, as seen in FIGURE 3, the parallel blades are disposed in vertical planes. Preferably the blades are made of ferrous material tipped with silver, tungsten, gold or the like, and are connected to suitable leads 32 and 34 for operating suitable mechanism (not shown) upon closing of the switch in the hereinafter described manner.

In order to close the switch 26 in response to a predetermined event such as the passing of a paper, a towel, coins or the like, a sensing element or cat whisker 36 is fixedly connected to a magnet 38 by means of a cat whisker retainer 39 set into the magnet as hereinafter further described. The magnet 38 has a hub 40 fixedly secured therein and riveted at 40a over a countersunk portion 39a of the retainer to provide a bearing for journalling the magnet on a pin extension 42 of the bolt 12, as also hereinafter further described.

When the sensing element 36 is swung upwardly to the dotted line position shown in FIGURE 2, as by the contact with a moving towel or the like, the magnet 38 will be correspondingly rotated to a predetermined angular extent as afforded by a slot 44 in the bottom wall of the housing 20. The angular displacement of the magnet 38 thereby rotates the poles of the magnet from an initial position wherein they have no effect on the blades 28 and 30, to a position where the flux induced in the blades creates effective opposite magnetic poles at the ends thereof to draw them together and close the switch.

In order to provide an effective cycle of operation for the switch, so as to precondition the mechanism operated by the switch for a successive switch-closing movement, it is necessary that the sensing element 36 be returned to its initial position to dispose the magnet in inoperative relation to the blades 28 and 30 and to restore the blades 28 and 30 to their original open condition. To this end, a second magnet 46 is provided which is relatively stationary and whose poles are disposed substantially oppositely to the corresponding poles of the magnet 38 in the initial position of the magnet 38. The magnet 46 is held against the yoke 22 by the adjustment nut 14 and by a flange 48 on the bolt 12. The magnet 46 is recessed at 50 to receive a bearing hub 52 therein so that the magnet 46 may be rotatably adjusted as hereinafter described.

In order to provide the initial position for the sensing element 36 and the magnet 38, a stop member 54, which may be a bolt or screw element, is threaded into the side of the yoke 22 corresponding to the return swing of the sensing element, which in the instant embodiment is clockwise, and so that the end of the bolt is positioned in register with the magnet 38. A nut element 56 is threaded on the bolt and against the yoke to adjustably determine the axial position of the bolt. At the end of the return swing of the sensing element therefore, the magnet 38 will abut the stop member 54, the axis of the magnet being substantially perpendicular to the axis of the capsule 27 at such time to preclude closing action on the blades 28 and 30.

Since the magnet 46 has its poles reversed relative to the magnet 38, when the sensing element 36 is rotated to the dotted line position of FIGURE 2, the magnet 46 will exert a restoring force on the magnet 38 and the sensing element 36.

In a preferred form of the invention and so as to prevent accidental operation of the switch and to produce a continuous restoring force to urge the magnet 46 to its return position, the magnet 46 is angularly displaced from the magnet 38 in the initial inoperative position of the magnet 38 by a predetermined extent, which is approximately 10° in the counterclockwise direction in the present embodiment. For this purpose, a stop boss 57 is formed on the rear wall of the yoke 22 at an upper, laterally displaced position relative to the vertical position of the magnet 46. A symmetrically located boss 58 is formed on the opposite side of the magnet as hereinafter described, to afford a means of continuously urging the sensing element to its return position in another embodiment of the invention. Accordingly, a force urging the magnet 38 and the sensing element 36 to their initial position is maintained even when these components are in the said initial position thereof. The relative angular displacement of the magnets in the initial position of the magnet 38 also renders the restoring force effective during the entire return cycle and brings the sensing element into firm contact with the stop means 54.

The retainer 39 for connecting the sensing element or cat whisker 36 to the magnet 38 is preferably engaged in a transverse recess 60 in the magnet and secured therein by the riveted portion 40a of the hub 40. In order to afford selective positioning of the cat whisker on either side of the magnet, as hereinafter described, the retainer defines bores 62 on opposite sides thereof, which are parallel with the longitudinal axis of the magnet, and inwardly extending bores 64 which are perpendicular to the bores 62 and may terminate therein. Correspondingly, the cat whisker has a loop 65 formed at its upper end, and extends through one of the bores 62 with the terminal portion of the loop resiliently fitting into the associated bore 64 in releasable engagement therewith. In the form shown, wherein the actuation of the cat whisker is in the clockwise direction, this connection is made at the side opposite the bolt 54.

The inner end of the bearing 40 in the magnet 38 may define an annular bearing flange 66 overlying the back of the magnet 38 and in bearing relationship with the bearing flange 48 hereinbefore described, whereby the rotational movement of the magnet 38 with respect to the magnet 46 is exceptionally easy. It will also be seen that the magnet 46 will maintain the magnet 38 in position on the pin extension 42.

Because the spring mechanism previously required to return a sensing element to its initial position produced a buildup of force as the sensing element was pivoted from its initial position, as well as an unequal return force, difficulties in achieving accurate sensing operation were encountered, and such devices were subject to breakdown and variation in the restoring force. The present invention eliminates these problems and permits the sensing element to be pivoted to the dotted position thereof in an easy manner which does not interfere with the movement of paper, etc., which is being detected, and the restoring force on the device is substantially uniform.

Further, in accordance with the invention, adjustment of the adjustment nut 14 and rotation of the housing 20 will serve to rotate the switch 26 carried thereby as well as the magnet 46. The initial position of the magnet 38 and the sensing element 36 may be retained and may also be adjusted by adjustment of the stop means 54. It will be seen that a change in the angular position of the switch 26 permits a change in the point of actuation of the switch, without any need for a change in the length of the sensing element 36. This feature is afforded by the concentric mounting of the pivot of the sensing element 36 and the switch element 26, as well as of the magnetic elements 38 and 46. The housing 20 is mounted for movement about the same axis as the axis of movement of the sensing element, and any angular change in the position of the housing and thus of the switch element 26 will bring the magnet 38 into closing relation with the switch at a different phase of the rotating upward movement of the sensing element 36 than previous to such adjustment, particularly where the stop means 54 has been adjusted to retain the initial position of the sensing element established prior to such change. Correspondingly, angular adjustment of the housing 20 and consequent angular adjustment of the magnet 46 as effected by the engagement of the magnet 46 with the bracket 22 will serve to vary the angular position of the magnet 46 relative to the initial or starting position of the magnet 38, particularly where the stop means 54 has been compensatingly adjusted so that the initial or starting position of the magnet 38 is retained. Thereby, the restoring force on the sensing element 36 may be varied as desired. It will be noted that slot 44 is sufficiently long in the direction of swing for the sensing element to accommodate adjustment of the initial position of the sensing element, and is also extended outwardly to the edge of the housing 22 to permit ready assembly of the device.

Referring now to FIGURE 4, a form of the invention is shown wherein the sensing element 36 is set into the bore 62 to afford a counterclockwise direction of rotation therefor upon actuation by an article to be detected. Accordingly, the bolt 54 is disposed on the opposite side of the yoke 22 from that provided in FIGURES 1–3, and the magnet 46 is in abutting relation with the boss 58. The operation of the device as aligned in FIGURE 4 is thus similar to that of the preceding embodiment, and will be appreciated that the detection of articles travelling in a direction opposite from articles to be detected by the first embodiment may be accomplished with only the minor adjustments indicated being required. The use of the boss 58 renders the 10° angular effect of magnet 48 easy to effect, and the bolt member 54 may also be reset without difficulty. As hereinabove set forth, the transfer of the sensing element or cat whisker 36 poses no problem since the terminal portion of the loop 60 may be released from opening or bore 64 in the position of FIGURES 1–3 and the sensing element reinserted in the right-hand side of retainer 39, in the example of FIGURE 4.

Referring now to FIGURES 5 and 6, another embodiment of the invention is shown wherein similar parts are again designated by corresponding numbers. In this construction, provision is made to open the switch 26 by actuation of the sensing element 36 in response to passage of paper, towels, coins or the like, the normal condition of the switch being closed as shown. To this end, the adjustment nut 14 affords positioning of the magnet 46 in abutting engagement beneath the boss 57, while the magnet 38 is normally disposed horizontally, the magnet 46 restoring the magnet 38 to such position and being substantially 10° displaced upwardly from the horizontal for this purpose. Thus, when articles to be detected are moved past the sensing element 36 to turn the magnet 38 counterclockwise, the switch will open at some point during the stroke, and the magnet 38 will thereafter be restored to its initial position by magnet 46, wherein horizontal alignment of its opposite poles with corresponding switch blades serves to closed the switch as seen in FIGURE 5. It will be noted that in this example, the sensing element 36 is inserted as previously described in the lower bore 62, with respect to the initial vertical position of the retainer 39, and is turned away from the magnet approximately 90° to correspond to the initial displacement of the magnet with respect to the preceding embodiments thereby to disposed the sensing element in downwardly disposed contact position, rather than in the elevated location which would otherwise be afforded by the indicated connection.

Referring now to FIGURE 7, another form of the invention is shown wherein the adjustment of the parts is reversed so that magnet 38 is rotated clockwise by passage of articles to be detected therepast. Thus the magnet 46 is disposed in abutting engagement beneath the boss 58 rather than the boss 57, and the bolt 54 is located on the opposite side of the yoke to engage the magnet 38 in its initial position, which again is horizontal to provide an initial closed condition for the switch 26. And the magnet 46 is displaced 10° from the magnet 38 in the said initial position thereof, whereby to uniformly and continuously bias the magnet 38 into its horizontal position. Clockwise movement of the sensing element 36 will thus rotate magnet 38 to a vertical position and thereby will open switch 26, and to afford such actuation of the sensing element, the portion thereof adjacent the magnet is bent 90° away from the magnet and from its condition in FIGURES 1–3. It will also be noted that the sensing element, though disposed in the lower bore 62 of the retainer 39, is reversed relative to the position of FIGURE 6, to correspond to the reversed direction of angular rotation, though, of course, variations in this respect may be accomplished in accordance with the particular construction of the sensing element or the characteristics of articles to be detected thereby.

Referring now to FIGURE 8, another embodiment of the invention is shown wherein similar parts are designated by similar reference numerals. The embodiment of FIGURE 8 is substantially similar in its general construction and operation to the embodiment of FIGURES 1–3, and affords the concentric adjustment as well as the elimination of spring means previously described. However, in this form of the invention, rotation of the sensing element 36 produces a mechanical switch closing action rather than a magnetic switch closing action. To this end, switch blades 28a and 30a are mounted on suitable insulative support means 68 which may be connected to the bracket 22 and one of the inwardly extending arms thereof in any suitable manner so that the ends of the blades 28a and 30a may be associated with suitable leads (not shown) for operating the mechanism controlled by the device of the invention. The blades 28a and 30a may be of a conventional type, and preferably have contacts 70 and 72 in opposed, normally spaced relation at their extremities. The blades 28a and 30a may be made of beryllium or other non-magnetic material, with the contacts being made of silver, tungsten or the like. In the form shown, the blades 28a and 30a extend to the same side of the bracket 22.

To effect the closing of the contacts 70 and 72, a cam element is mounted for rotation with the magnet 38, and this element may be a pin 74 set perpendicularly in the retainer 39 on the side thereof adjacent the blades 28a and 30a and at a predetermined distance below these blades in an initial position of the device. Accordingly, upon rotation of the sensing element 36 as hereinbefore described with respect to FIGURES 1 through 3, the pin 74 will be rotated upwardly to urge the lowermost switch element or blade 30a (in the example shown) upwardly and to dispose the contact 72 into closing relation with the contact 70 to close the switch. It will, of course, be understood that the switch thus provided could be disposed beneath the pin 74 with the pin angularly displaced from the position for energizing the switch above the cam. Other locations for the switch means could be utilized within the scope of the invention in a manner not magnetically actuating the contacts, as will be understood from the preceding discussion.

By utilizing a pair of magnets in the relationship described, and wherein one magnet is substantially stationary and the other is rotatable by a sensing element, a restoring force may be imparted to the sensing element which is effective for displacement of the sensing element of from 90° to 135° from its initial position. By providing an angular displacement of slight amount between the two magnets for the initial position of the rotatable magnet, an over-travel effect for the sensing element is produced such as to forcibly bring the sensing element back to its initial position and to maintain a restoring force on the rotatable magnet and thus on the sensing element which overcomes any tendency toward loose swinging of the sensing element and creates a precision of operation and control not available with any devices of the type heretofore produced. Because of the consistent angular force acting on the magnet both during its rotation to the outward position of the sensing element and to the return position thereof, irregularities in control and jamming of the materials is avoided in a manner not possible with spring means, and it will be appreciated that a magnetic return in accordance with the invention is applicable to substantially any type of switch using a rotational control. A further advantage of the displacement between the magnets 38 and 46 in the initial position of the magnet 38 is that a zero magnetic force is assured on the switch means, and adjustment to this end is further obtainable by the stop means 54 which will provide an initial position of the magnet 38 which obviates any tendency toward energizing the switch. Also, adjustment of the over-travel effect and of the magnet 46 and its angular relation to magnet 38 is readily obtainable simply by rotating the housing 22, as a result of the concentric mounting for the component parts.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A sensing switch including switch means having contact elements, a sensing element engaged by traveling articles and pivotally movable in response to the passage of articles past said sensing element, means effecting movement of said contact elements from an initial condition thereof in response to pivotal movement of said sensing element including a magnet pivotally movable with said sensing element, and magnetic restoring means for restoring said sensing element to said initial position subsequent to said pivotal movement of said sensing element away from an initial condition, after the passage of an article thereby, comprising a second magnet mounted adjacent said first magnet and having an opposite polarity to that of said first magnet.

2. A sensing switch comprising a first magnet, means journaling said magnet, a sensing element mounted for rotation with said magnet, stop means providing an initial position for said first magnet and said sensing element, a second magnet mounted in operative relation to the first magnet with its poles substantially reversed relative to the poles of said first magnet in the initial position of the first magnet and normally open switch means closable by predetermined angular displacement of said sensing element and said first magnet from the initial position thereof, said switch means including a pair of contact elements of magnetically responsive material and means mounting said contact elements to extend from opposite sides of the first magnet substantially perpendicularly to the axis of said first magnet in the initial position of said first magnet to preclude closing action on said contact elements, the inner ends of said contact elements partially overlapping and being in proximate relation to the first magnet such as to cause the first magnet to impart flux to said contact elements upon said predetermined angular displacement such as to close said contact elements, said second magnet exerting restoring force on said first magnet to return said first magnet and said sensing element to said initial position thereof.

3. A sensing switch comprising a first magnet, means journaling said magnet, a sensing element mounted for rotation with said magnet, stop means providing an initial position for said first magnet and said sensing element, a second magnet mounted in operative relation to the first magnet with its poles substantially reversed relative to the poles of said first magnet in the initial position of the first magnet and normally closed switch means openable by predetermined angular displacement of said sensing element and said first magnet from the initial position thereof, said switch means including a pair of contact elements of magnetic material and means mounting said contact elements to extend from opposite sides of the first magnet substantially parallel to the axis of said first magnet in the initial position of said first magnet to close said contact elements by flux action on said contact elements, the inner ends of said contact elements partially overlapping and being in proximate relation to the first magnet such as to obviate flux to said contact elements upon said predetermined angular displacement such as to open said contact elements, said second magnet exerting restoring force on said first magnet to return said first magnet and said sensing element to said initial position thereof.

4. A sensing switch comprising a first magnet, means journaling said first magnet, a sensing element mounted for rotation with said first magnet, stop means providing an initial position for said magnet, a second magnet mounted in operative relation to the first magnet with its poles substantially reversed relative to the poles of the first magnet in the initial position of the first magnet and switch means closable by predetermined angular displacement of said first magnet and said sensing element from the initial position thereof, said switch means including a pair of contact elements of magnetically responsive material and means mounting said contact elements to extend from opposite sides of the first magnet in the initial position thereof to preclude closing action on said contact elements, the inner ends of said contact elements partially overlapping and being in proximate relation to the first magnet such as to cause the first magnet to impart flux to the contact elements upon said predetermined angular displacement such as to close the contact inner ends, said contact elements being in planes normally disposed parallel to the plane of said first magnet to maximize the effect of flux thereon, said second magnet exerting a restoring force on said first magnet to return said first magnet and said sensing element to said initial position.

5. A sensing switch comprising a first magnet, means journaling said first magnet, a sensing element mounted for rotation with said first magnet, stop means providing an initial position for said first magnet, a second magnet mounted in operative relation to the first magnet with its poles substantially reversed relative to the poles of the first magnet in the initial position of the first magnet and switch means closable by predetermined angular displacement of said first magnet and said sensing element from the initial position thereof, said switch means including a capsule, a pair of contact elements of magnetically responsive material sealed in said capsule, and means mounting said capsule with said contact element extending from opposite sides of the first magnet perpendicularly to the axis of the first magnet in the initial position thereof, the inner ends of said contact elements partially overlapping and being in proximate relation to the first magnet such as to cause the first magnet to impart flux to the elements upon said predetermined angular displacement such as to close the contact elements, said second magnet exerting a restoring force on said first magnet to return said first magnet and said sensing element to said initial position.

6. A sensing switch comprising a first magnet, means journaling said magnet, a sensing element mounted for rotation with said first magnet, stop means providing an initial position for said first magnet, a second magnet mounted in operative relation to the first magnet with its poles substantially reversed relative to the poles of said first magnet in the initial position of the first magnet and switch means closable by predetermined angular displacement of said first magnet and said sensing element from the initial position thereof, said switch means including a cam element mounted for corotation with said first magnet, a pair of contact elements and means mounting said contact elements on one side of said first magnet and in normally spaced relation to one another and said cam element whereby said first magnet does not close said contact elements, said contact elements being positioned to be closed by said cam element upon said predetermined angular displacement of said first magnet and said sensing element, said second magnet exerting a restoring force on said first magnet to effect return of said first magnet and said sensing element to said initial position thereof.

7. A sensing switch comprising switch means having contact elements of magnetically responsive material, a sensing element pivotal in response to the passage of materials or the like therepast, magnetic means for actuating said contact elements upon said pivotal movement of said sensing element and magnetic means for restoring said sensing element to an initial position including a normally stationary magnet and a magnet journalled in proximate relation to said stationary magnet and rotatable with said sensing element, said magnets having oppositely aligned poles in the initial position of said rotatable magnet, and including means for determining said initial position of said sensing element and said rotatable magnet, said stationary magnet being angularly offset from said rotatable magnet in the initial position of said rotatable magnet to an extent sufficient to provide a definite restoring force on said rotatable magnet even in the unoperated position of the switch.

8. A sensing switch comprising support means including an axially elongated support member, a magnet rotatably mounted on said support member, a sensing element concentrically mounted for rotation with said rotatable magnet, and responsive to passage of materials or the like therepast to rotate said rotatable magnet, switch means, means concentrically mounted on said support member supporting said switch means, said switch means being operable in response to rotation of said rotatable magnet, adjustable means determining an initial position for said sensing element and said rotatable magnet and a stationary magnet concentrically and adjustably mounted on said support member and having its poles reversed relative to the poles of said rotatable magnet, said means supporting said switch means being angularly adjustable and adjusting the angular position of said stationary magnet concurrently, said means determining the initial position of said rotatable magnet and said sensing element being adjustable to retain the initial position of said rotatable magnet and said sensing elements obtaining prior to the adjustment of said supporting means.

9. A sensing switch comprising support means including an elongated support member, a magnet rotatably mounted on said support member, mounting means adjustably and concentrically mounted on said support member, switch means mounted on said mounting means and including a pair of normally spaced contact elements each extending from an opposite side of said rotatable magnet and spaced in proximate relation to said rotatable magnet, a sensing element rotatable with said rotatable magnet, means determining an initial position for said sensing element and said rotatable magnet, said initial position of said rotatable magnet being perpendicular to the longitudinal axes of said contact elements and said sensing element being rotatable by the passage of materials or the like therepast to rotate the rotatable magnet from said initial position thereof, said rotatable magnet being effective to close said contact elements magnetically upon predetermined angular movement from said initial position, and a stationary magnet concentrically mounted on said support member in proximate relation to said rotatable magnet such as to exert a restoring force on said rotatable magnet to return it to said initial position, said mounting means being adjustable to vary the angular position of said switch means and said means for determining an initial position of said sensing element and said rotatable magnet being adjustable to retain said initial position whereby the extent of angular movement of said sensing element and said rotatable magnet to close said contact elements may be varied as desired.

10. A sensing switch comprising support means including a support member, a magnet rotably mounted on said support member, mounting means adjustably and concentrically mounted on said support member, switch means mounted on said mounting means and including a pair of normally closed contact elements each extending from an opposite side of said rotatable magnet and spaced in proximate relation to said rotatable magnet, a sensing element rotatable with said rotatable magnet, means determining an initial position for said sensing element and said rotatable magnet, said initial position of said rotatable magnet being parallel to the longitudinal axes of said contact elements and producing the flux to keep said contact elements closed and said sensing element being rotatable by the passage of materials or the like therepast to rotate the rotatable magnet from said initial position thereof, said rotatable magnet being effective to open said contact elements upon predetermined angular movement from said initial position, and a stationary magnet concentrically mounted on said support member in proximate relation to said rotatable magnet such as to exert a restoring force on said rotatable magnet to return it to said initial position, said mounting means being adjustable to vary the angular position of said switch means and said means for determining an initial position of said sensing element and said rotatable magnet being adjustable to retain said initial position whereby the extent of angular movement of said sensing element and said rotatable magnet to open said contact elements may be varied as desired.

11. A sensing switch comprising support means including an elongated support member, a magnet rotatably mounted on said support member, mounting means adjustably and concentrically mounted on said support member, switch means mounted on said mounting means and including a pair of contact elements each extending from an opposite side of said rotatable magnet and in proximately spaced relation thereto, a sensing element rotatable with said rotatable magnet, means determining an initial position for said sensing element and said rotatable magnet, said sensing element being rotatable by the passage of materials or the like therepast to rotate the rotatable magnet from said initial position thereof, said rotatable magnet being effective to actuate said contact elements upon predetermined angular movement from said initial position, and a stationary magnet concentrically mounted on said support member in proximate relation to said rotatable magnet such as to exert a restoring force on said rotatable magnet to return it to said initial position, said mounting means being adjustable to vary the angular position of said switch means and said means for determining an initial position of said sensing element and said rotatable magnet being adjustable to retain said initial position whereby the extent of angular movement of said sensing element and said rotatable magnet to actuate said contact elements may be varied as desired, said stationary magnet engaging said mounting means to be angularly adjusted by adjustment of said mounting means.

12. A sensing switch comprising support means including an elongated support member, a U-shaped bracket of non-magnetic material having the bight thereof rotatably mounted on said support member with the legs thereof parallel with said support member, a switch including a capsule extending across said legs and having a contact element extending inwardly therethrough from each end thereof, a magnet rotatably mounted on said support member in proximate relation to said switch, a sensing element connected to said magnet for rotation therewith, stop means for determining an initial position of said magnet, said stop means being adjustably mounted on said bracket, a stationary magnet on said support member and within said bracket, said support member including means urging the stationary magnet against the bight of said bracket, said stationary magnet being in proximate, parallel relation to the rotatable magnet with the poles thereof reversed relative to the poles of the rotatable magnet in the initial position of the rotatable magnet, said bracket being angularly adjustable to vary the angular position of the switch, said stop means being adjustable to retain said initial position, adjustment of said bracket effecting angular adjustment of the stationary magnet, said rotatable magnet having substantially zero closing influence on the switch in one position thereof and being effective to close the switch in another position thereof.

13. In a sensing switch, a bracket, a pair of magnets, elongated means mounting one of said magnets adjustably against said bracket and the other of said magnets rotatably in front of said one of said magnets, a sensing element on the other of said magnets, switch means on said bracket operable by actuation of said sensing element from an initial position thereof, means defining an initial position of said sensing element and said other of said magnets wherein said magnets have their poles substantially reversed, and stop means on said bracket defining an offset position for said one of said magnets wherein a definite restoring force is exerted on said other of said magnets in positions thereof including said initial position.

14. In a sensing switch, a bracket, a pair of magnets, elongated means mounting one of said magnets adjustably against said bracket and the other of said magnets rotatably in front of said one of said magnets, a sensing element on the other of said magnets, switch means on said bracket operable by actuation of said sensing element from an initial position thereof, means defining an initial position of said sensing element and said other of said magnets wherein said magnets have their poles substantially reversed, a pair of stop elements on said bracket selectively providing an offset position for said one of said magnets wherein a definite restoring force is exerted on said other of said magnets in said initial position thereof when movement of said other of said magnets is either clockwise or counterclockwise, selectively.

15. In a sensing switch, a bracket, a pair of magnets, elongated means mounting one of said magnets adjustably against said bracket and the other of said magnets rotatably in front of said one of said magnets, a sensing element on the other of said magnets, switch means on said bracket operable by actuation of said sensing element from an initial position thereof, means defining an initial position of said sensing element and said other of said magnets wherein said magnets have their poles substantially reversed, a pair of stop elements on said bracket selectively providing an offset position for said one of said magnets wherein a definite restoring force is exerted on said other of said magnets in said initial position thereof when movement of said other of said magnets is either clockwise or counterclockwise, selectively, and when said switch is normally closed or normally open, selectively.

References Cited in the file of this patent

UNITED STATES PATENTS

| Number | Name | Date |
|---|---|---|
| 1,958,482 | Leins | May 15, 1934 |
| 2,061,047 | Schweitzer | Nov. 17, 1936 |
| 2,274,019 | Weider | Feb. 24, 1942 |
| 2,352,830 | Ford | July 4, 1944 |
| 2,620,412 | Ford | Dec. 2, 1952 |